United States Patent [19]

Inagaki et al.

[11] Patent Number: 4,706,549
[45] Date of Patent: Nov. 17, 1987

[54] OIL PRESSURE CONTROL SYSTEM FOR POWER TRANSMISSIONS

[75] Inventors: Toshiyuki Inagaki, Kariya; Hiroaki Maeda, Toyota, both of Japan

[73] Assignee: Aisin Seiki Kabushiki Kaisha, Kariya, Japan

[21] Appl. No.: 895,825

[22] Filed: Aug. 12, 1986

[30] Foreign Application Priority Data

Aug. 26, 1985 [JP] Japan ............................ 60-187850
Sep. 30, 1985 [JP] Japan ............................ 60-216976

[51] Int. Cl.$^4$ ............................................. F15B 11/08
[52] U.S. Cl. ........................................ 91/448; 60/484; 60/494
[58] Field of Search .................. 91/446, 447, 448, 444; 60/484, 494, 459, 468

[56] References Cited

U.S. PATENT DOCUMENTS 3,999,386 12/1976 Crull et al. .................... 60/494 X
4,208,874 6/1980 Field, Jr. ....................... 60/494 X
4,282,898 8/1981 Harmon et al. ................ 91/446 X Primary Examiner—Edward K. Look
Attorney, Agent, or Firm—Burns, Doane, Swecker & Mathis

[57] ABSTRACT

An oil pressure control system for a power transmission which includes an oil pump, a regulator valve, an inching valve, a selector valve, a change over valve, a modulator valve, a clutch servo, a first oil passage for communicating the oil pump with the selector valve via the regulator valve and the inching valve, a second oil passage for communicating the selector valve with the change over valve and the clutch servo, a third oil passage for communicating the change over valve with one end of the modulator valve and a fourth oil passage for communicating the first oil passage located between the inching valve and the selector valve with the other side of the modulator valve. The system permits a smooth, controlled operation of the clutch servo.

5 Claims, 3 Drawing Figures

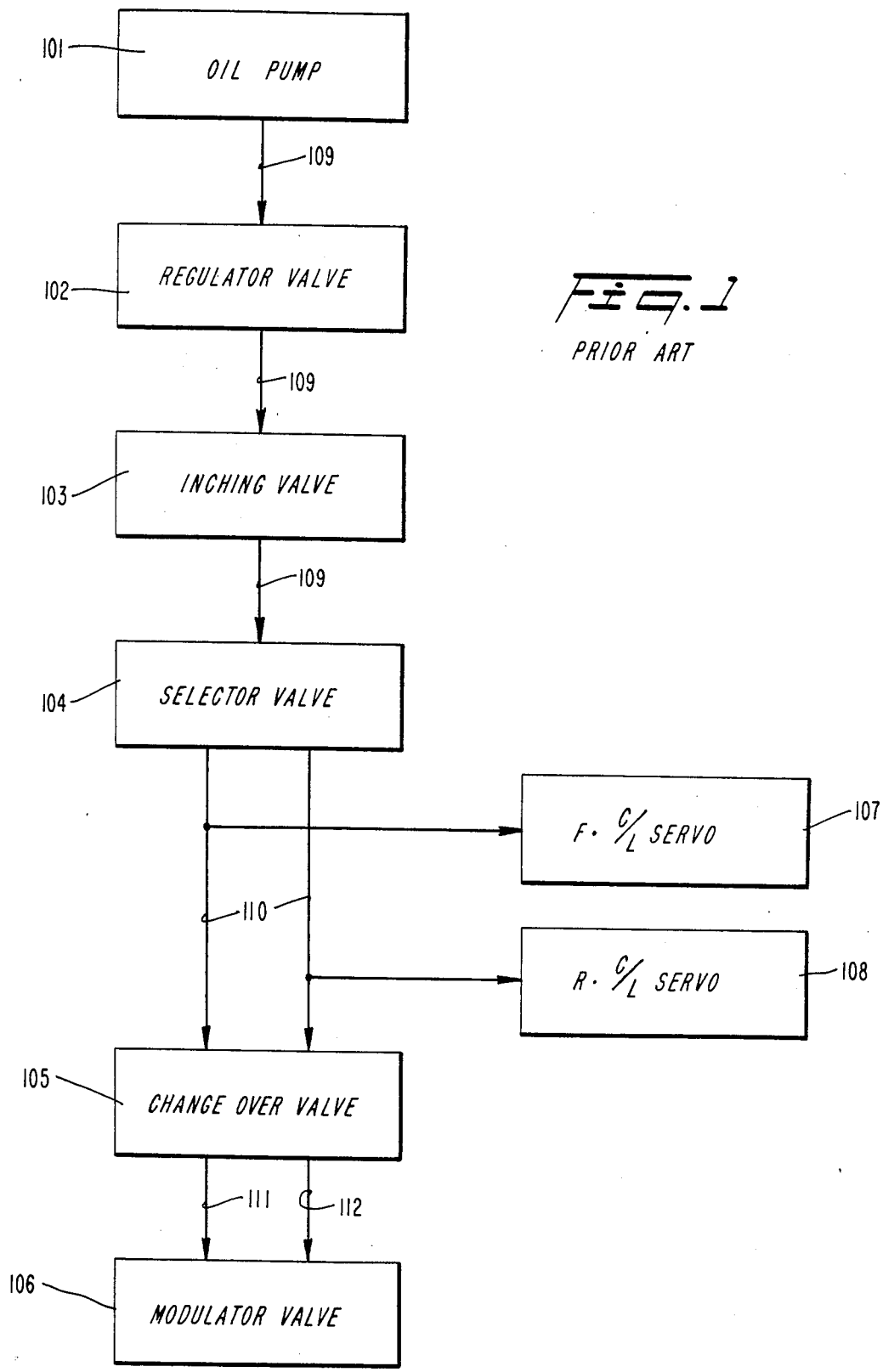

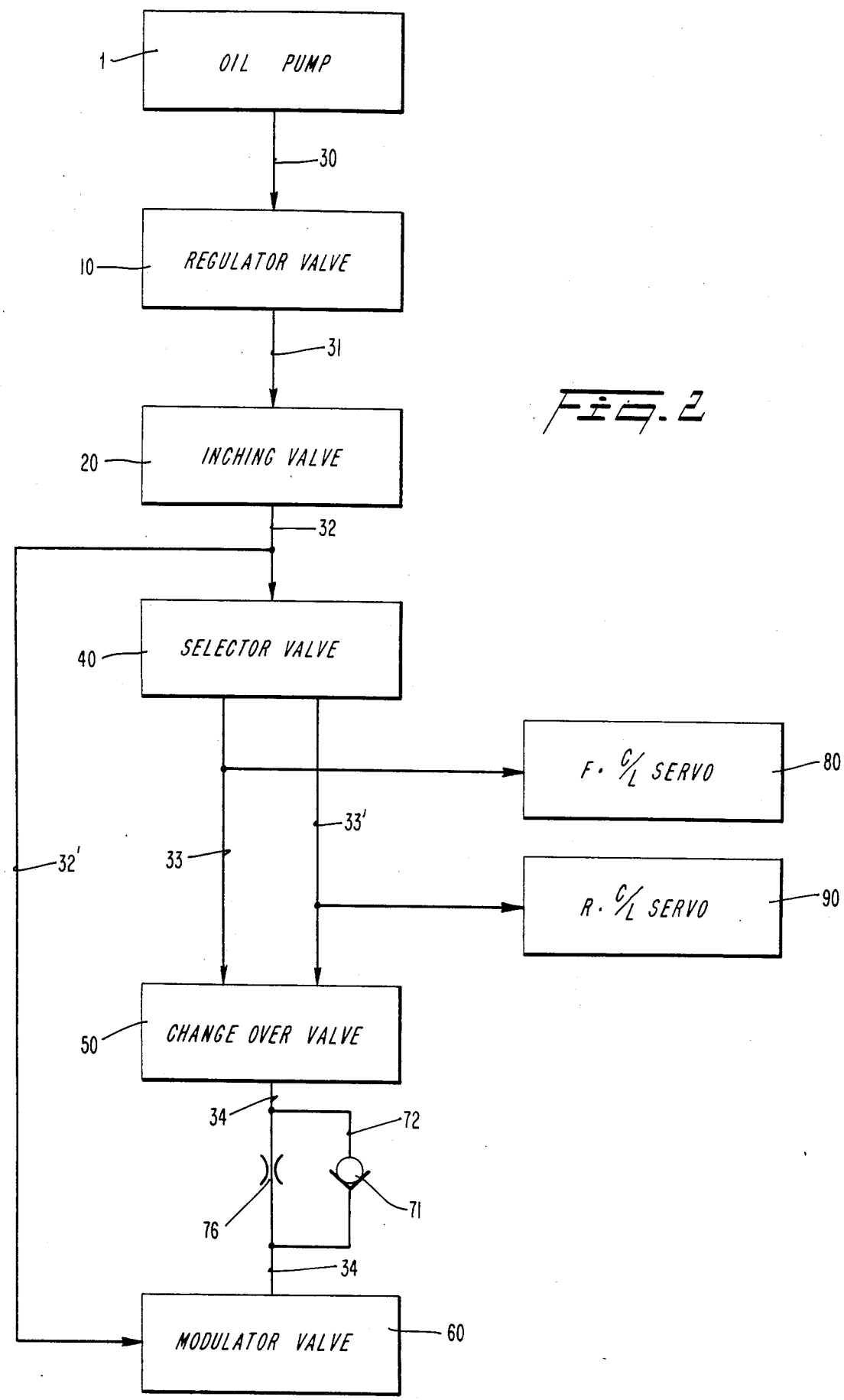

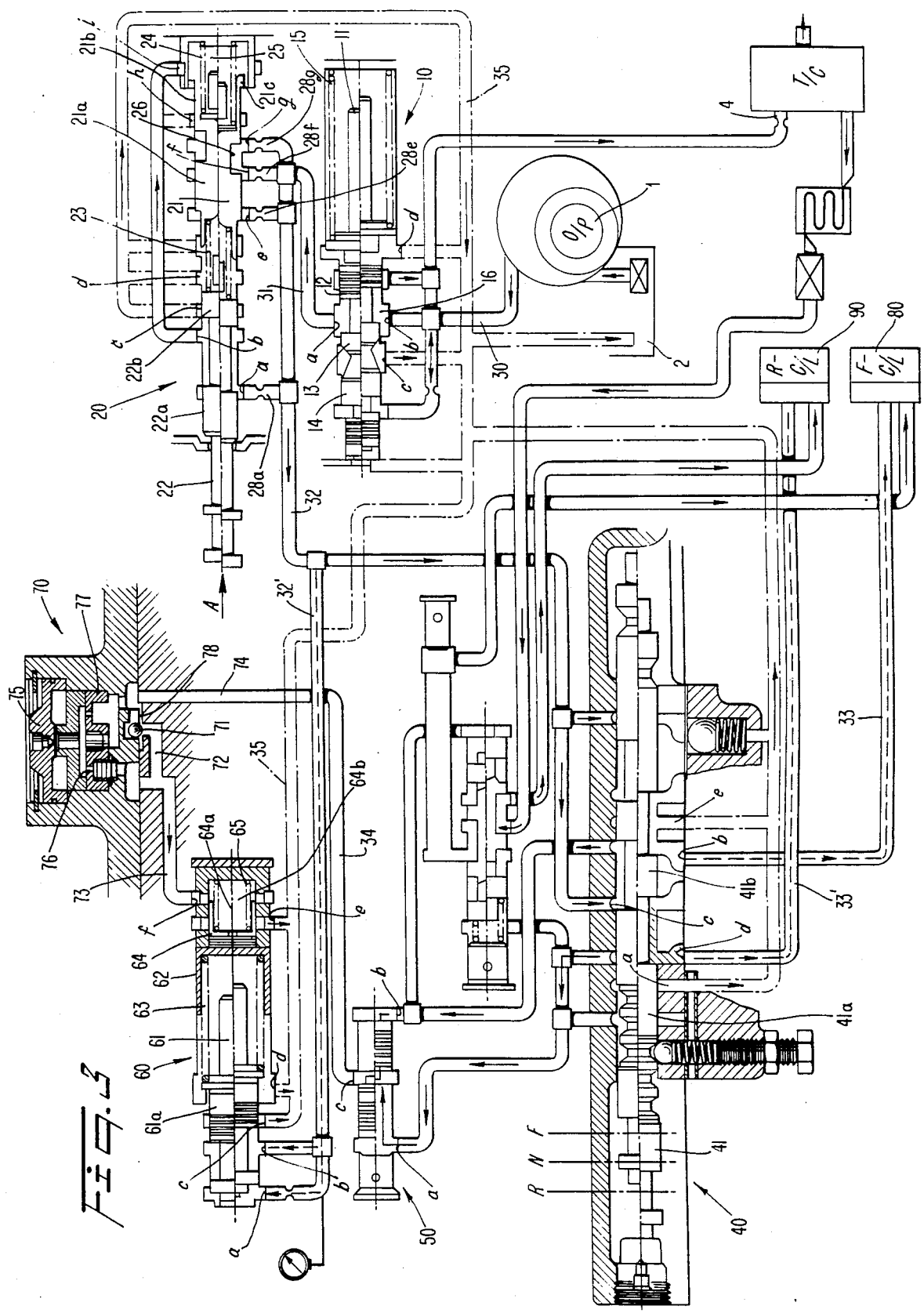

OIL PRESSURE CONTROL SYSTEM FOR POWER TRANSMISSIONS

BACKGROUND OF THE INVENTION

1. Field of the Invention

This invention relates generally to oil pressure control systems for power transmissions, and more specifically to an oil pressure control system for a power transmission in a heavy duty vehicle, for example, a forklift which modulates an oil pressure supplied to a clutch servo controlling the power transmission.

2. Description of the Prior Art

A conventional oil pressure control system for a power transmission is disclosed in the Japanese Laid-Open patent application No. 59-81231 (1984), wherein as shown in FIG. 1, an oil pressure control system includes an oil pump 101 as a pressure source, a regulator valve 102, an inching valve 103, a selector valve 104, a change over valve 105, a modulator valve 106, a plurality of clutch servos 107 and 108, a first oil passage 109 for communicating the oil pump 101 with the selector valve 104 via the regulator valve 102 and the inching valve 103, a second oil passage 110 for communicating the selector valve 104 with the change over valve 105 and clutch servos 107 and 108, a third passage 111 for communicating the change over valve 105 with one end of the modulator valve 106, and a fourth oil passage 112 for communicating the change over valve 105 with the other end of the modulator valve 106. An oil pressure introduced to the second oil passage 110 from the oil pump 101 via the first oil passage 109 is introduced to the modulator valve 106 via the third and fourth passages 111, 112 and modulated by the modulator valve 106. The modulated oil pressure in the second oil passage 110 is supplied to the clutch servos 107 and 108. In such conventional systems, a pressure loss is caused at a branch point between the clutch servos 107 and 108 and the side of change over valve 105 within second oil passage 110 and an inlet portion of modulator valve 106 within the third oil passage 111. Therefore, in order to compensate for the pressure loss, oil pressure at the modulating valve 106 is controlled so as to obtain a proper operating oil pressure for supplying to the clutch servos 107, 108.

However, the pressure loss is not a constant because the oil pressure condition changes with respect to the selected position of selector valve 104, and the oil pressure is affected by the change over valve 105. Consequently in conventional fluid pressure control system, the operation of clutch servos 107 and 108 is not stabilized.

SUMMARY OF THE INVENTION

It is an object of the present invention to avoid the aforementioned and other disadvantages of conventional oil pressure control systems.

More particularly, an object of the present invention is to provide an improved oil pressure control system which can decrease the aforementioned pressure loss and stabilize the operation in the clutch servo.

These and other objects are accomplished by the oil pressure control system of the present invention which includes a first oil passage for communicating an oil pump with a selector valve via a regulator valve and an inching valve, a second oil passage for communicating the selector valve with a change over valve and a plurality of clutch servos, a third oil passage for communicating the change over valve with one side of a modulator valve, and a fourth oil passage for communicating the first oil passage located between the inching valve and the selector valve with the other side of the modulator valve.

Therefore, in the present invention, an oil pressure is supplied to the one side of modulator valve by a fourth oil passage in communication with the inching valve, the selector valve and the change over valve. Consequently, a pressure loss caused by either a selected position in the selector valve or a resistance in the change over valve is prevented. As the result, a proper and stabilized oil pressure modulated by the modulator valve is supplied to the clutch servos.

BRIEF DESCRIPTION OF THE DRAWINGS

A more complete appreciation of the invention and the attendant advantages thereof will be readily obtained as the same becomes better understood by reference to the following detailed description when considered in connection with the accompanying drawings, wherein:

FIG. 1 is a schematic view of a conventional oil pressure control system;

FIG. 2 is a schematic view of the oil pressure control system according to the present invention; and FIG. 3 illustrates details of the oil pressure control system disclosed in FIG. 2.

DETAILED DESCRIPTION OF THE PREFERRED EMBODIMENTS

Referring now to the drawings, and more particularly to FIG. 2, there is shown an oil pressure control system including an oil pump 1 as a pressure source, a regulator valve 10, an inching valve 20, a selector valve 40, a change over valve 50, a modulator valve 60, and a plurality of clutch servos 80 and 90 which are used for selecting forward and reverse operation, respectively. Also included is a first oil passage formed by passages 30, 31 and 32 for communicating the oil pump 10 with the selector valve 40 via the regulator valve 10 and the inching valve 20, a second oil passage formed by a passage 33 for communicating the selector valve 40 with the change over valve 50 and the forward clutch servo 80 and a passage 33' for communicating the selector valve 40 with the change over valve 50 and the reverse clutch servo 90, a third oil passage 34 for communicating the change over valve 50 with one side of the modulator valve 60, a fourth oil passage 32' for communicating the passage 32 as the first passage with the other side of the modulator valve 60, an orifice 76 disposed in the third oil passage 34, and a one-way check valve 71 positioned in a bypass 72 arranged in parallel with the orifice 76. The bypass passage 72 is part of the third passage 34.

As shown in FIG. 3, the oil pump 1 is driven by an output shaft of an engine (not shown). An oil pressure generated by the oil pump is supplied to an inlet port b of regulator valve 10 via passage 30, defining a portion of the first oil passage and also supplied to a torque converter T/C via an orifice 4. An outlet port a of regulator valve 10 communicates with a port f of an inching valve 20 via the oil passage 31, defining an additional portion of the first oil passage. An outlet port g of inching valve 20 communicates with an inlet port c of selector valve 40 via the oil passage 32, defining a further portion of the first oil passage. Each outlet port b and d of selector valve 40 communicates with each clutch servo 80 and 90 and each inlet port a and b of change over valve 50 via passages 33 and 33' defining the second oil passage. An outlet port c of change over valve 50 communicates with one inlet port f of modulator valve 60 via third oil passage 34.

The orifice 76 disposed in the third oil passage 34 is formed with a disk-shaped orifice member 77 having a plurality of orifices so as to provide a variable orifice. The member 77 is rotatably mounted on the housing by a plug 75 so as to permit selection of one of the plurality of orifices and obtain the desired orifice effect as discussed below. An oil passage 74 is on an upstream side of the third passage 34 and an oil passage 73 is on a downstream side of the third passage 34. The one way check valve 71 is positioned in bypass passage 72 and is formed with a ball type valve which is engageable with a valve seat 78 in the absence of any biasing force by a spring.

When an oil pressure in the oil passage 73 in communication with inlet port f of modulator valve 60 is higher than the oil pressure in the oil passage 74 in communication with outlet port c of change over valve 50, the one-way check valve 71 is disengaged with the valve seat 78 so that the oil pressure in the passage 73 in communication with an accumulating chamber 64b in the modulator valve 60 is drained to the upstream side oil passage 74 of third oil passage 34. The oil passage 32 communicates with the other inlet ports a and b of modulator valve 60 via the fourth oil passage 32'.

Each of the drain ports c, d and e of modulator valve 60 communicate with an oil sump 2 via a drain passage 35. Both drain ports a and e of selector valve 40 communicate with the oil sump 2 via a drain passage 35. Drain ports c and d of regulator valve 10 communicate with the oil sump 2 via the oil drain passage 35.

The oil pressure in the passage 31 is from regulator valve 10 and is regulated to an opening degree between an oil chamber 16 formed within regulator valve 10 and a valve land 12 formed on the valve spool 11 of regulator valve 10, wherein the valve spool 11 is operated by a balancing force defined by a biasing force of a spring 15 and an oil pressure operating to valve lands 12, 13 and 14 formed on valve spool 11 as an input oil pressure of regulator valve 10.

The selector valve 40 has a valve spool 41 having both valve lands 41a and 41b movable to a forward shift position F and a reverse shift position R from a neutral position N, so that an inlet port c is selectively communicated with outlet ports b and d.

The change over valve 50 selectively supplies the output pressure of selector valve 40 to the modulator valve 60 via the third oil passage 34 in response to the shifted positions F and R of selector valve 40.

The modulator valve 60 includes a valve spool 61 having a valve land 61a, a piston 62, a compression spring 63 disposed between the valve spool 61 and the piston 62, a second piston 64 having an orifice 64a and controlling ports e and f. A spring 65 biases the second piston 64 leftwardly as seen in the drawings. The modulator valve 60 modulates an output oil pressure from the inching valve 20 so as to relieve a variable ratio of oil pressure supplied to each clutch servo 80 and 90.

In response to a selection of the forward shift position F of selector valve 40, the front clutch servo 80 is operated to assume the engaged condition and reverse clutch servo 90 is operated to the released condition. Both clutch servos 80 and 90 are operated to assume the released condition when the neutral position N of selector valve 40 is selected.

The inching valve 20 includes an inching valve spool 21 having valve lands 21a, 21b and 21c controlling an input oil pressure supplied to the inching valve 20 from passage 31. A first spring 23 biases the valve spool 21 in one direction and a second spring 24, acting in opposition to the first spring 23, biases the valve spool 21 in a direction opposite to the first spring 23. An inching rod 22, for depressing the valve spool 21 via first spring 23 is interlocked to an inching pedal or a brake pedal (both not shown), moves in a direction indicated by arrow A in response to the movement of the pedal. The inching rod 22 has valve lands 22a and 22b which direct an input oil pressure from the oil passage 32 to an oil chamber 25 within the inching valve 20 via ports a, b and i when the inching valve is in a non-operating condition (such non-operating condition of inching rod 22 is indicated by the lower half portion). Under operating conditions of inching rod 22 (such operating conditions of inching rod 22 is indicated by the upper half portion), the inching rod 22 shuts off the port a and opens a drain port c if the inching rod 22 when moved in the direction indicated the arrow A. As a result, the input oil pressure supplied to the oil chamber 25 is shut off and released to drain. In order to obtain such operation of inching rod 22, a distance L1 between ports a and c of inching valve 20 is longer than a distance L2 between valve lands 22a and 22b of inching rod 22. It is desirable that the distance L1 is longer than the distance L2 by 0.5 to 1.0 mm.

The valve spool 21 forms an oil chamber 26 between valve lands 21a and 21b. The valve land 21a is moved in a closing direction of an inlet port f of inching valve 20 under the operating conditions of inching rod 22. The land 21b of valve spool 21 closes a drain port h of inching valve 20 during the non-operating condition of inching rod 22, and opens the drain port h during the operating condition of inching rod 22. A drain port d of inching valve 20 is continuously in communication with the drain passage 35 and with a chamber in which the first spring 23 is positioned. Ports a, e and g of inching valve 20 communicate with the oil passage 32 via orifices 28a, 28e and 28g, respectively.

The operation of inching valve 20 is as follows:

Under the non-operating condition of inching rod 22, the output oil pressure of regulator valve 10 is introduced to the oil passage 32 from the oil passage 31 via port f, oil chamber 26 and port g of inching valve 20. The oil pressure supplied to the oil passage 32 is introduced to the oil chamber 25 via ports a, b and i. The oil pressure introduced to the oil chamber 25 in combination with the spring 24 moves the valve spool 21 to the left as shown in FIG. 3. The oil pressure in the passage 32 also operates to move the valve spool 21 rightwardly (as shown in FIG. 3) by the introduction of oil pressure via the port e of inching valve 20. However, the leftward moving force of valve spool 21 is greater than the rightward moving force of valve spool 21, as the result, the valve spool 21 is maintained in the position indicated by the lower half portion thereof, and the drain port h is closed. Therefore, the input oil pressure introduced from regulator valve 10 to the oil passage 32 is maintained by orifices 28a, 28e and 28g. The oil pressure in oil passage 32 is introduced to the selector valve 40 and, via the fourth oil passage 32' to ports a and b of modulator valve 60. The oil pressure introduced to the ports a and b of modulator valve 60 modulates the oil pressure in the oil passage 32. Such modulated oil pressure in the oil passage 32 is supplied to clutch servos 80 and 90 via oil passages 33 and 33'. As the result, the oil pressure in passages 33 and 33' does not experience the pressure loss, as previously discussed, caused by the change over valve 50.

When the selector valve 40 is shifted to the forward position F or the reverse position R, the oil pressure in the oil passage 74 is higher than that in the oil passage 73, therefore, the one-way check valve 71 is moved into engagement with the valve seat 78 and the bypass passage 72 is closed.

When the selector valve 40 is moved to the neutral position N from the forward shift position F or the reverse shift position R, the oil pressure in the oil passage 73 lifts the one-way check valve 71 off the valve seat 78 and the bypass passage 72 is opened so that the oil pressure in the accumulating chamber 64b in the modulator valve 60 is released via bypass passage 72. As a result, the oil pressure in the accumulating chamber 64b is immediately dropped to zero. Consequently, even if the selector valve 40 is changed to the forward shifted position F or the reverse shifted position R, immediately after movement to the neutral position N, the initial modulating pressure is held to a predetermined value.

If the pedal (not shown) is depressed, the inching rod 22 of inching valve 20 is moved in the direction indicated by the arrow A. The inlet port a of inching valve 20 is shut off if the pedal is depressed further and the drain port c of inching valve 20 is opened and the oil pressure in the oil chamber 25 changes to a pressure corresponding to the differential biasing force between springs 23 and 24. Accordingly, the spool 21 gradually moves rightwardly in response to the degree of opening drain port c of inching valve 20, and the spool 21 moves to the position indicated by upper half portion thereof in FIG. 3. Consequently, the oil pressure in oil passage 32 is decreased and clutch servos 80 and 90 are moved to the released condition.

Obviously, numerous modifications and variations of the present invention are possible in light of the above teachings. It is therefore to be understood that within the scope of the appended claims, the invention may be practiced otherwise than as specifically described herein.

We claim:

1. An oil pressure control system for power transmissions comprising:

an oil pressure source;
   a regulator valve;
   an inching valve;
   a selector valve;
   a change over valve;
   a modulator valve;
   at least one clutch servo;
   a first oil passage for communicating said oil pressure source with said selector valve via said regulator valve and said inching valve;
   a second oil passage for communicating said selector valve with said change over valve and said at least one clutch servo;
   a third oil passage for communicating said change over valve with a first end of said modulator valve; and
   a fourth oil passage for communicating said first oil passage with a second end of said modulator valve.

2. An oil pressure control system for power shift transmissions according to claim 1, wherein said third oil passage includes an orifice and a one-way check valve.

3. An oil pressure control system for power transmissions according to claim 2, wherein said one-way check valve is positioned in a bypass passage and arranged in parallel with said orifice.

4. An oil pressure control system for power transmissions according to claim 2, wherein said one-way check valve only permits fluid communication from said modulator valve to said change over valve.

5. An oil pressure control system for power transmissions according to claim 2, wherein said one-way check valve includes a ball element as a valve body and a valve seat.

* * * * *